J. N. J. HILBERT.
BOX MAKING MACHINE.
APPLICATION FILED AUG. 12, 1908.
1,131,131.
Patented Mar. 9, 1915.
8 SHEETS—SHEET 5.
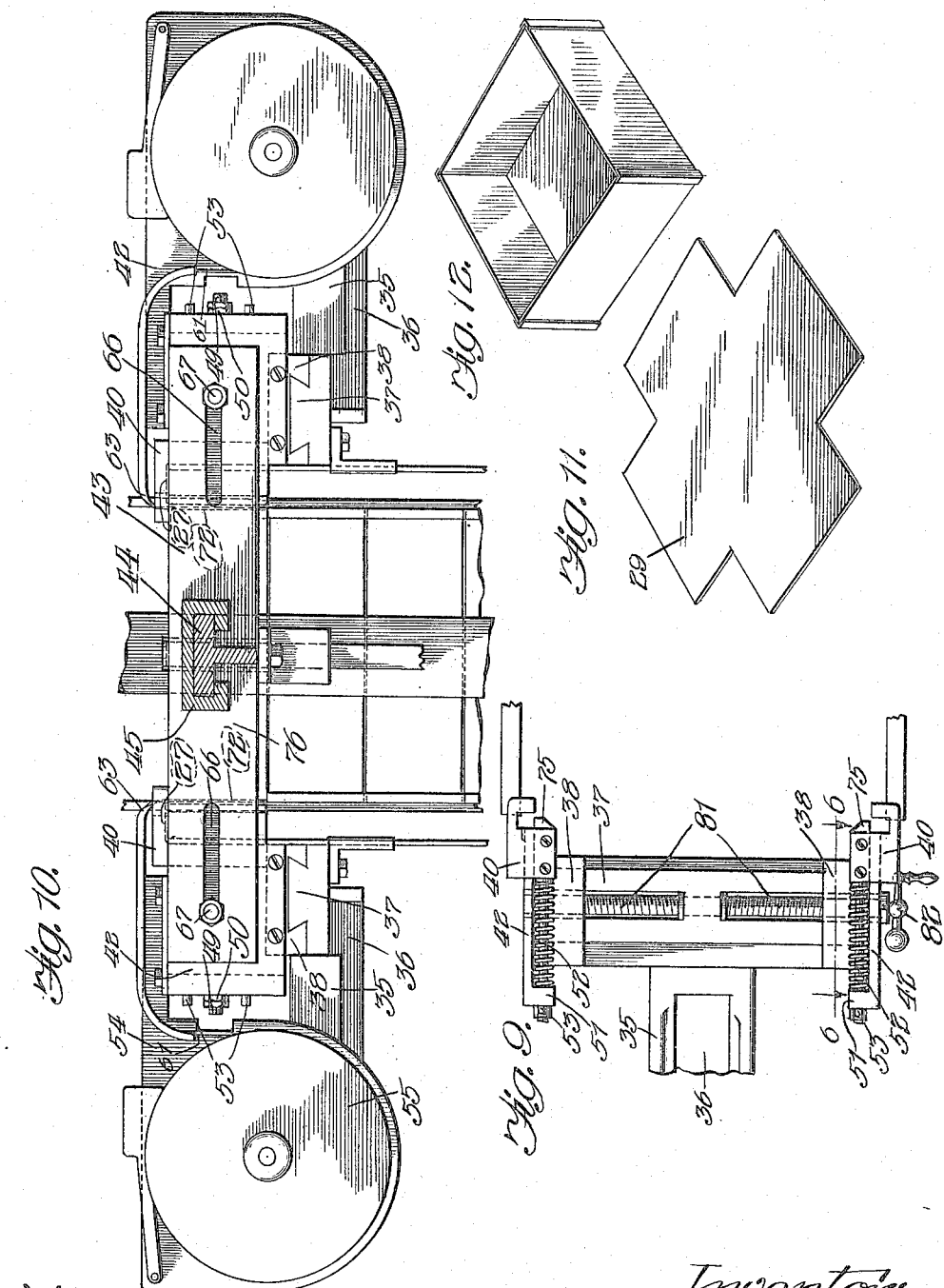

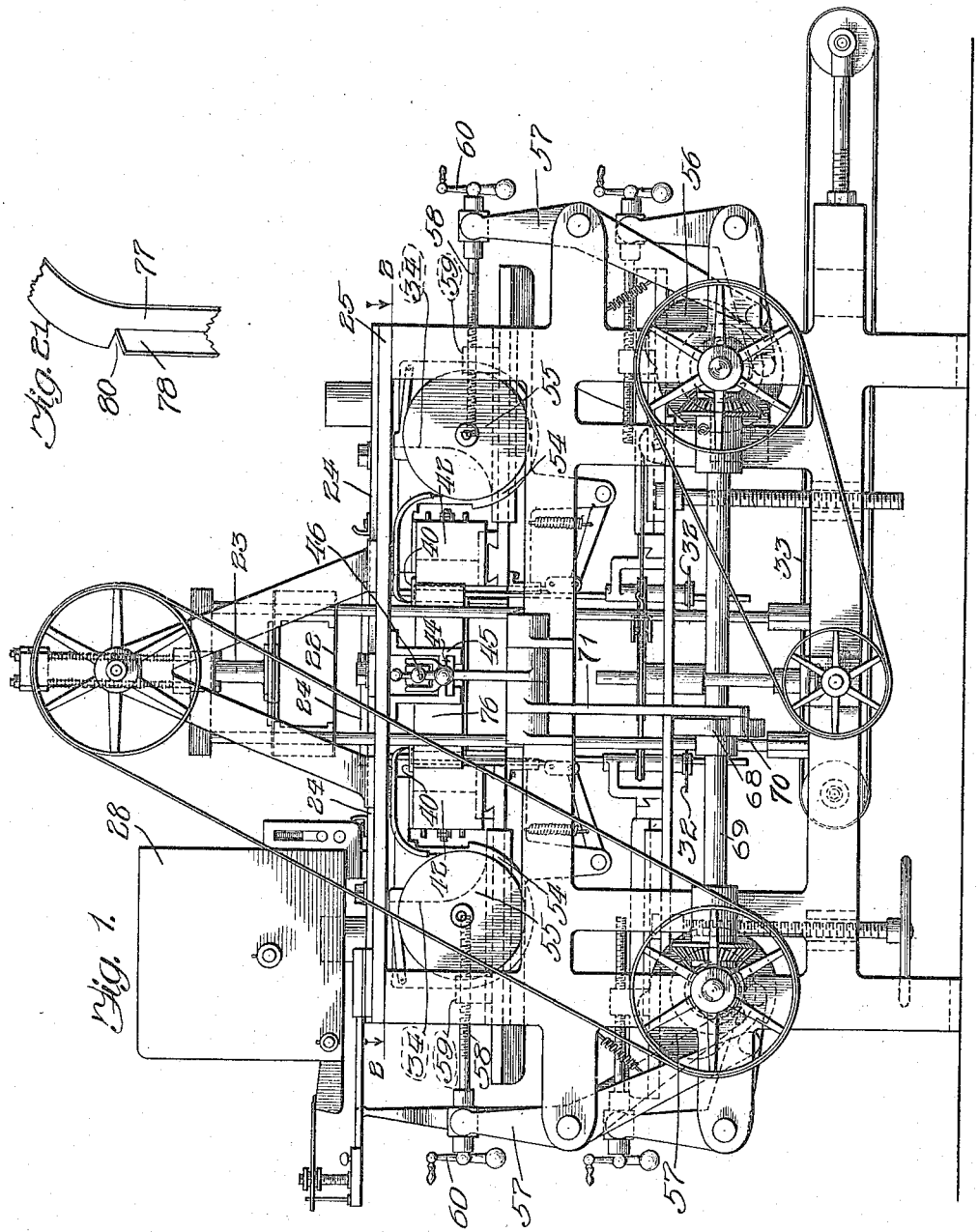

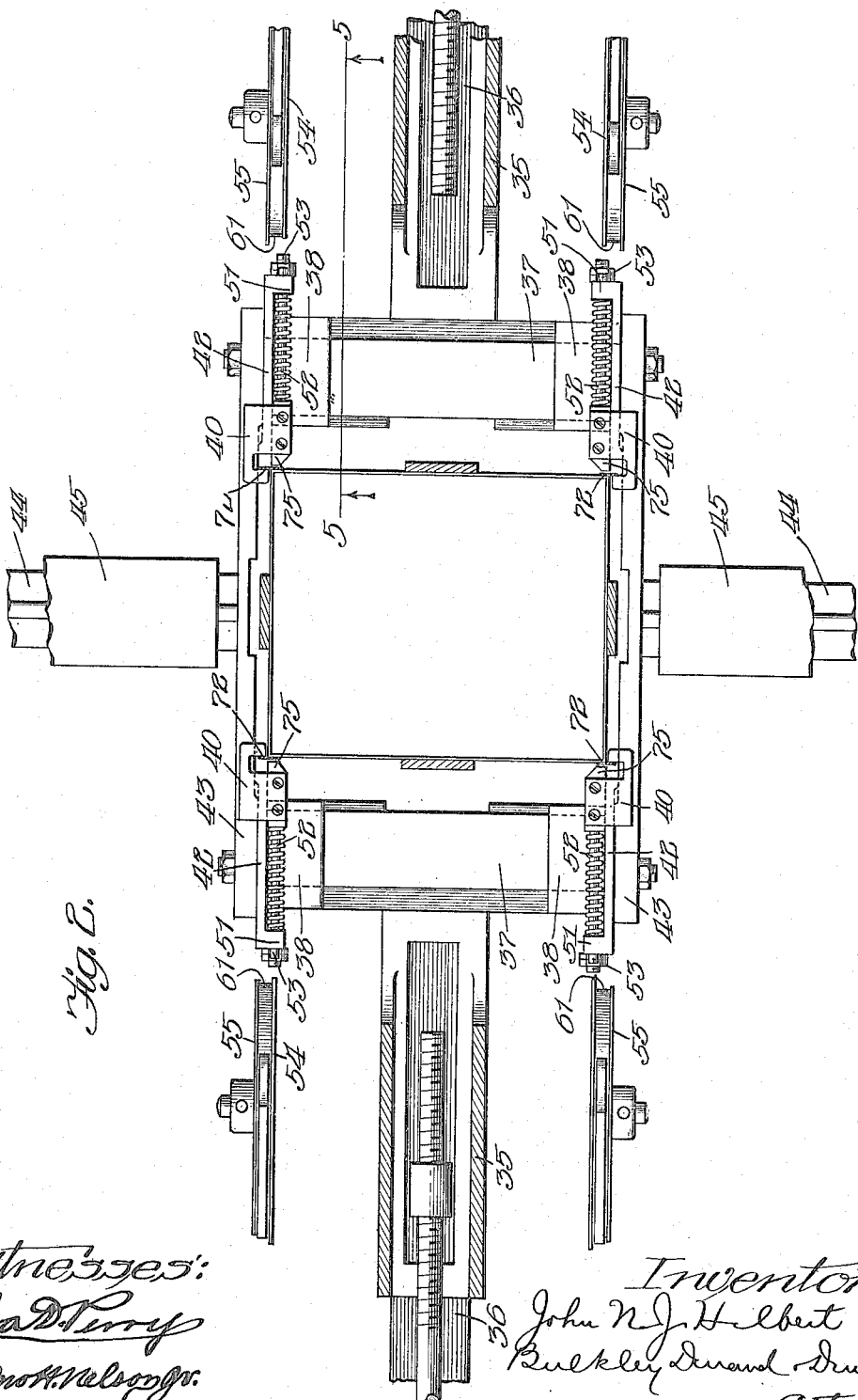

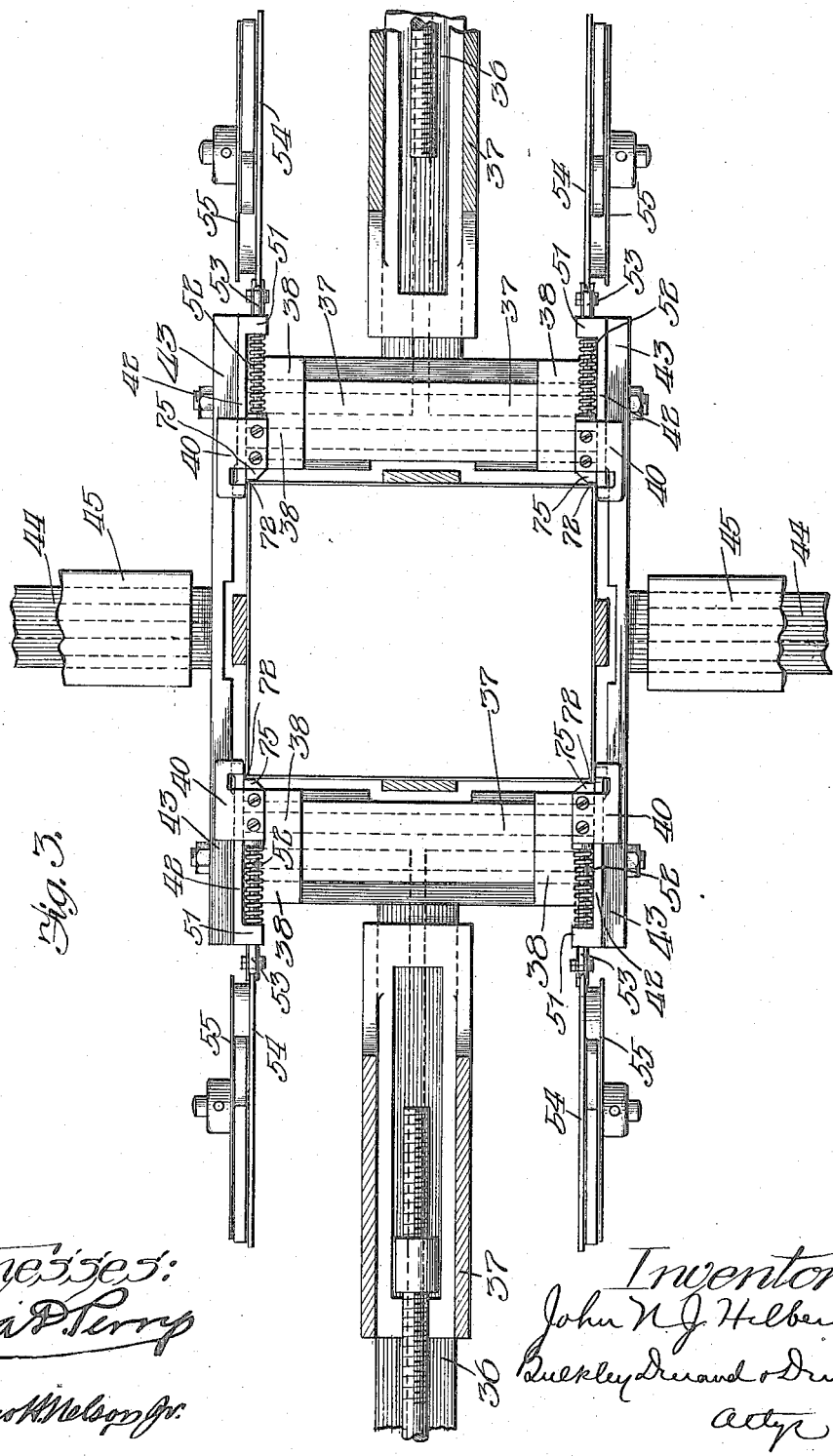

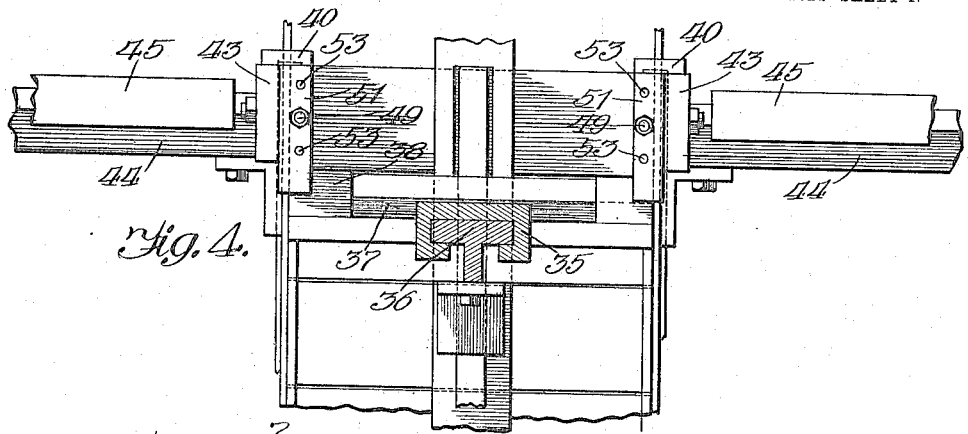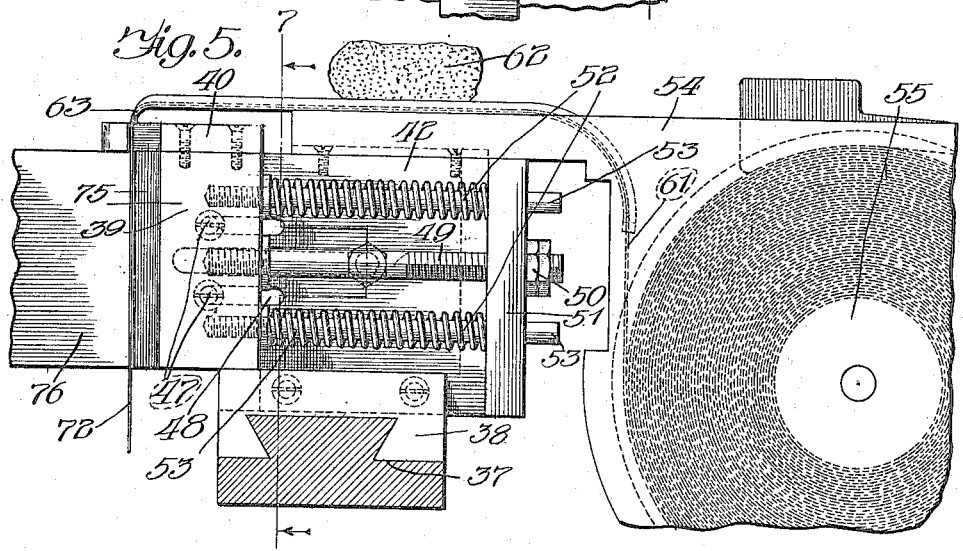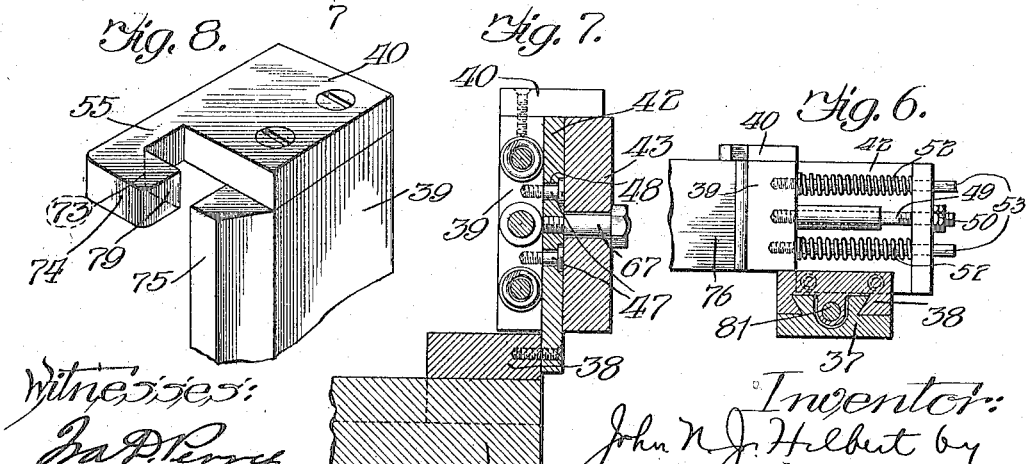

J. N. J. HILBERT.
BOX MAKING MACHINE.
APPLICATION FILED AUG. 12, 1908.

1,131,131.

Patented Mar. 9, 1915.
8 SHEETS—SHEET 6.

Witnesses:

Inventor:
John N. J. Hilbert
by Buckley Durand & Drury
Attys

J. N. J. HILBERT.
BOX MAKING MACHINE.
APPLICATION FILED AUG. 12, 1908.

1,131,131.

Patented Mar. 9, 1915.
8 SHEETS—SHEET 7.

Witnesses:

Inventor:
John N. J. Hilbert
by Buckley Durand
& Drury Attys

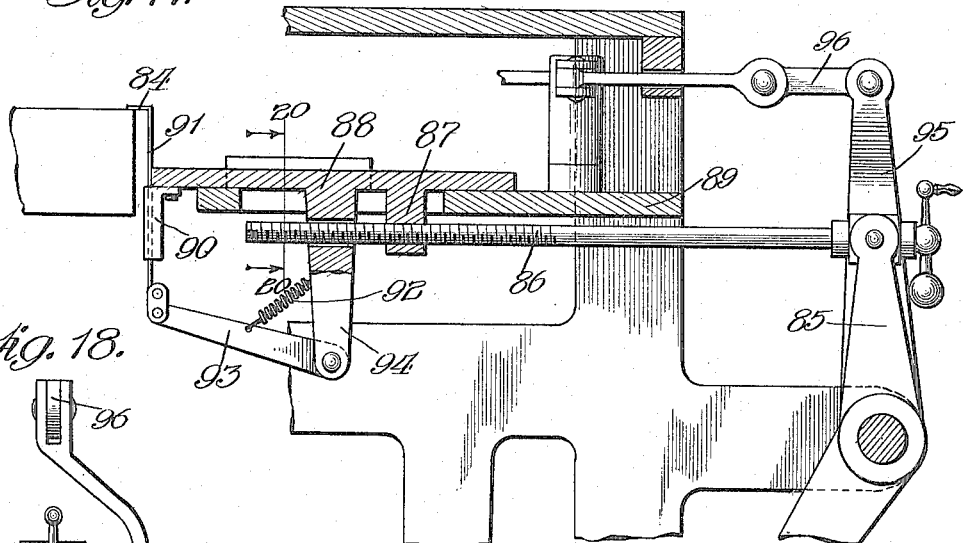
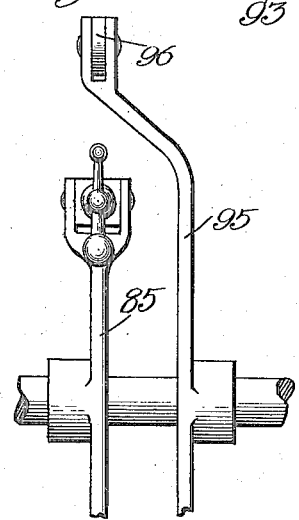
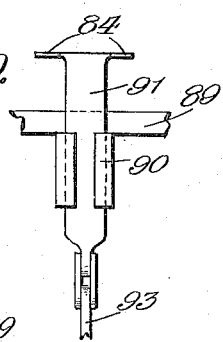
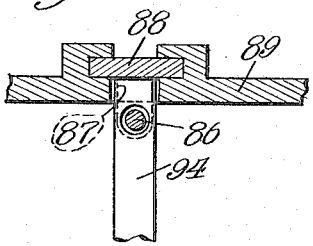

UNITED STATES PATENT OFFICE.

JOHN N. J. HILBERT, OF CHICAGO, ILLINOIS, ASSIGNOR TO J. PHILIP BIRD, OF NEW YORK, N. Y.

BOX-MAKING MACHINE.

1,131,131.  Specification of Letters Patent.  Patented Mar. 9, 1915.

Application filed August 12, 1908. Serial No. 448,159.

*To all whom it may concern:*

Be it known that I, JOHN N. J. HILBERT, a citizen of the United States of America, and resident of Chicago, Illinois, have invented a certain new and useful Improvement in Box-Making Machines, of which the following is a specification.

My invention relates to improvements in box making machines, and has for its object the production of a machine in which the tape for securing the corners of the box may be brought into position to be affixed to the box without being twisted or bent out of shape.

A further object is the production of a machine in which the tape is partially severed, as it is secured to the box.

A further object is the production of a device of comparatively simple construction, and one that can be used in connection with certain types of machines without materially altering the machine.

These and such other objects as may hereinafter appear are attained by my device, embodiments of which are illustrated in the accompanying drawings, in which—

Figure 13:
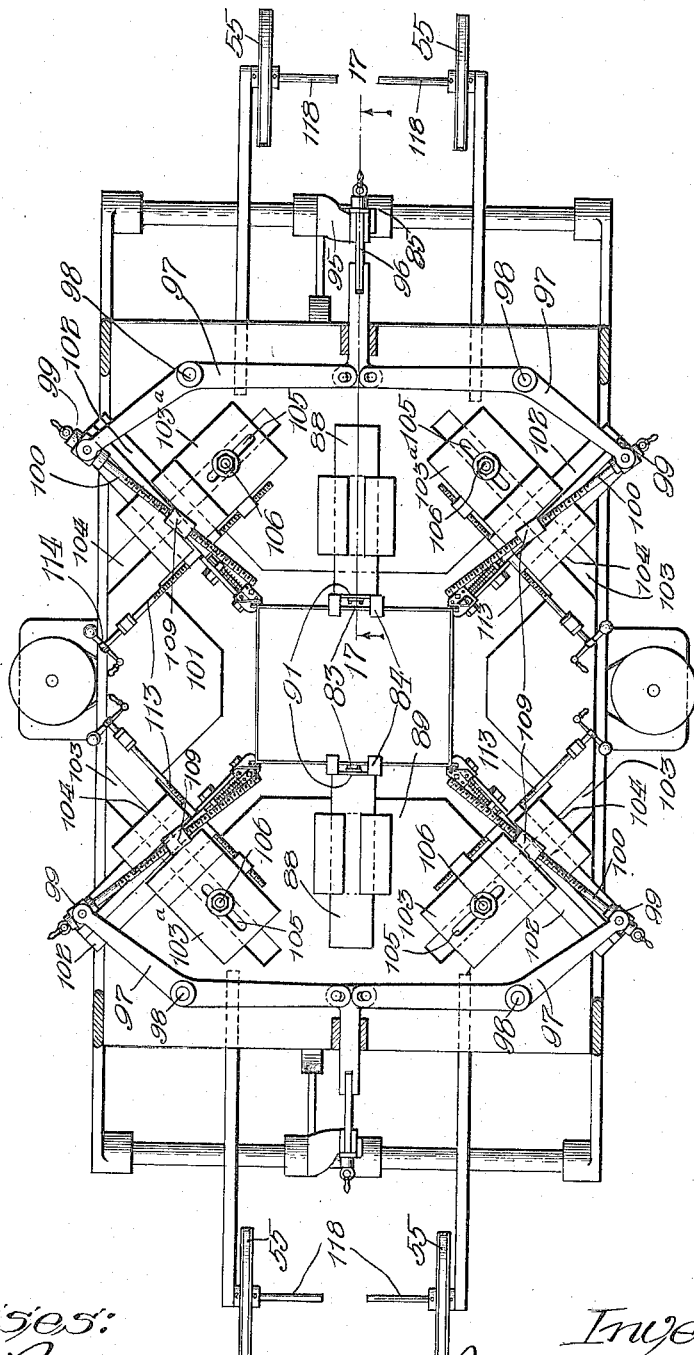
Figure 14:
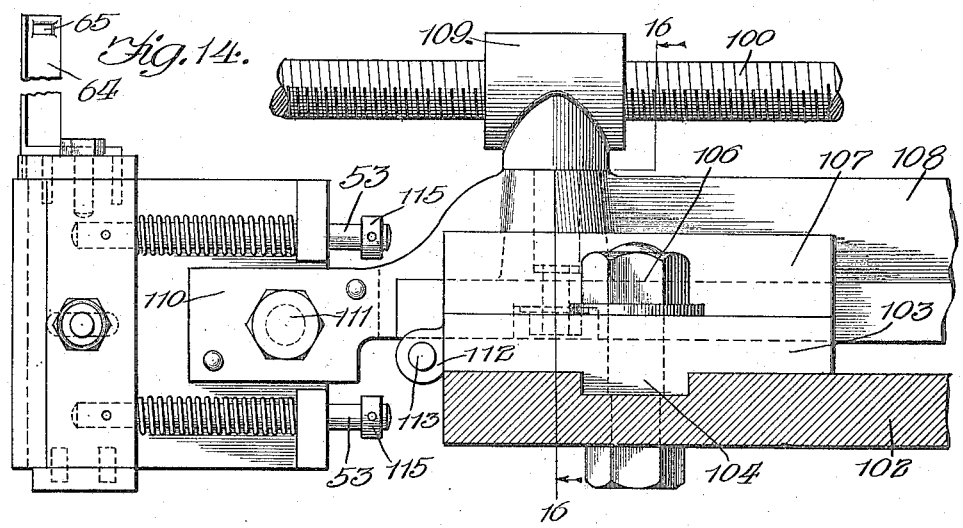
Figure 15:
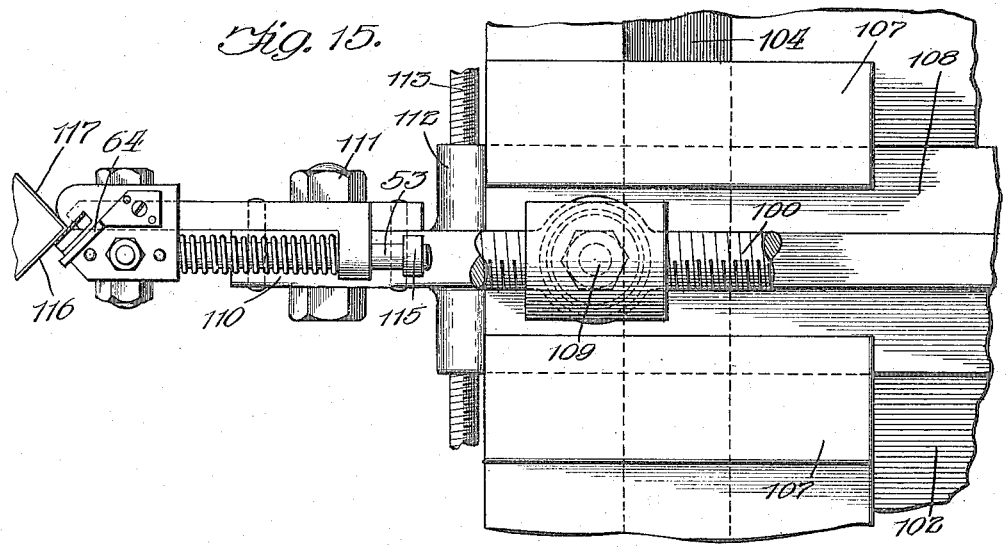
Figure 16:
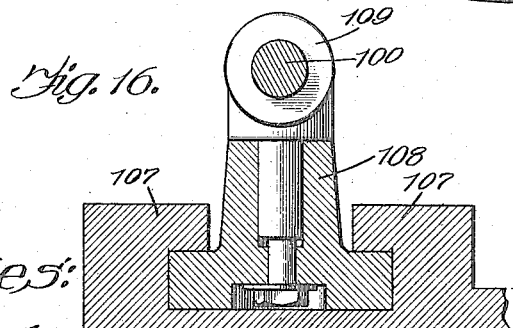

Figure 1 represents a side elevation of my machine. Fig. 2 represents a horizontal sectional view on the line 2—2 of Fig. 1, looking in the direction indicated by arrows, showing the cutting mechanism (knives not engaged). Fig. 3 shows a horizontal sectional view on the line 2—2 of Fig. 1, looking in the direction indicated by the arrows, with the cutting mechanism in changed position. Fig. 4 is an end elevation of the cutting device. Fig. 5 represents a sectional view on the line 5—5 of Fig. 2, looking in the direction indicated by the arrows, showing the method of feeding tape. Fig. 6 represents a sectional view on the line 6—6 of Fig. 9, looking in the direction indicated by the arrows. Fig. 7 represents a sectional view on the line 7—7 of Fig. 5, looking in the direction indicated by arrows. Fig. 8 represents a perspective view of the cutting tool, omitting one blade. Fig. 9 represents a modification in part of Fig. 2, showing means for independently adjusting the position of the cutting and pressing members. Fig. 10 represents a side elevation of Fig. 2 enlarged. Fig. 11 represents a perspective view of the box-blank. Fig. 12 represents a perspective view of a finished box. Fig. 13 represents a modification and rearrangement of parts of Figs. 2 and 3. Fig. 14 represents an enlarged sectional view of a portion of Fig. 13. Fig. 15 represents a plan view of Fig. 14. Fig. 16 represents a sectional view on line 16—16 of Fig. 14, looking in the direction indicated by arrows. Fig. 17 represents an enlarged detail taken on the line 17—17 of Fig. 13, showing action of separator fingers. Fig. 18 represents an end view of Fig. 17. Fig. 19 represents a front view of the separator fingers. Fig. 20 represents a sectional view on line 20—20 of Fig. 17, looking in the direction indicated by the arrows. Fig. 21 represents an enlarged perspective view of the tape showing it partly severed.

Referring now to the several figures of the drawing, in order to describe generally the operation of the machine to which my device is applicable, the box former 22, secured to the bottom of the plunger 23, is adjusted to the exact size required, and by the adjustment of the guides 24 on the table 25, the well 26 is caused to conform with the size and shape of the former, and sufficiently larger to permit the former to press the material, from which the box is made, between itself and the sides of the well. The stroke of the plunger is regulated so that the former will pass within the well and downwardly a distance equal to the inside depth of the box. The separator fingers 27 are adjusted so that when the fingers are forced outwardly within the well, and the box forced down by the plunger, the bottom of the box will just rest on top of the separator fingers.

The feed box 28 is provided with an opening at the front (not shown) adjusted to suit the thickness of the cardboard or other material from which the box is formed, so that only one blank 29 is forced through the opening at a time. This blank falls on the table under the former, and is held in proper position by means of the stops. The operation of the machine then forces the plunger downwardly, as above described, and the box is formed into shape. The strips of tape 61 are brought from the roll 55 through the guide and in a vertical position adjacent the outer corners of the box. The separator fingers 27 which have been forced downwardly until they have reached the proper position, depending on the depth of the box, are then withdrawn, the fingers, released from their position beneath the box, fly upwardly and inwardly sufficient to serve the purpose of the strippers when the plunger is withdrawn. During this period, the plunger dwells, and the severing and pasting operation takes place. This operation, which comprises the essence of my invention, will be described in detail later. The plunger having drawn the former from the well, and the separating fingers acting as strippers, holding the box in place, the separating fingers resume their normal position projecting within the well in position to be engaged by the next box and forced downwardly to their lowest position. This operation is repeated, until the well of the machine is filled with a string of boxes at their four corners with continuous strips of tape. At a predetermined time, depending on the size of the boxes, the lowermost box will reach a point in the bottom of the well at which the space between the lowest and the next box above is exactly opposite the four saws 32 located one at each corner of the well. These saws are preferably continuously operated, and when adjusted vertically to the desired position are then swung in simultaneously severing the tape at the four corners. The severed box then drops upon the carrier 33, which is moving continuously, and the box is then carried away from the machine.

In an application filed by J. Philip Bird, of even date herewith, Serial No. 448,160, August 12, 1908, the complete and detailed operation of this machine, which has been briefly described above, has been gone into in full detail, and reference is made to that application for any explanation not given here.

Referring now more particularly to sheets 1, 2, 3 and 4: Below the table are mounted a plurality of brackets 34, on which are mounted gibs and guides 35 in which slide bars 36, on one end of each of which bars is mounted a cross bar 37. On this cross bar are adjustable slides 38, on which are mounted the tools proper.

The combined pressing and cutting tool, forming the invention of the present application, comprises a pressing member 39 and a cutting member 40 mounted on top of the pressing member. Below the cutting member and at the side of the pressing member is placed a combined cutter and presser bar 42. The position of this member in relation to the work required is regulated by means of bars 43 on opposite sides, carried by bars 44, sliding in a set of brackets 45, the setting of which is done by means of a screw and handle 46. The pressing member 39 is secured to the member 42 by means of screws 47 running in slots 48 to permit lateral motion. On the member 39 is also mounted a stop comprising a stud 49 and lock nut 50, the stud passing through a lip 51 integral with or secured to the member 42. A pair of compression springs 52 surround pins 53, mounted on the lip 51 and member 39. On the top of the presser bar 41 and back of the cutting member is mounted a bracket 54 holding the tape roll 55, so that the position of the tape roll is always the same with relation to the tools. The reciprocal movement of the tools is effected through the medium of a cam 56 acting on a bell crank lever 57 on the upper end of which is pivoted a screw 58 passing through the lug 59 on the slide. The adjustment of the position of the tool is effected by the handle 60 on the screw 58, the screw acting as a pitman as well as a means of adjustment.

The tape 61 passes over a way or guide and is moistened in any desired manner, as by a sponge 62. This guide preferably terminates in a downwardly extending end 63, just above the cutter bar opening. In the modification shown on sheets 6, 7 and 8, the guide 64 is provided with a slot 65, and is mounted on top of the cutter bar, as shown in Fig. 14.

The bars 43 are provided with slots 66, and screw bolts 67 extend through these slots and into the cutter bar 42. This permits the cutting tools to slide on the bar 43. Movement of this bar at right angles to the cutting tool is effected through the cam 68 on the shaft 69 and a roller 70 on the end of the lever 71.

Let us now consider the completion of the box. The tape 61 passes over the guide 63 and hangs down, as shown at 72 in Fig. 5, against the inner face 73 of the hook 74 on the end of the cutter bar 40, and against the outer face 75 of the presser bar 39—that is, between it and the side of the box 76. The operation of the machine then moves the members 39, 40, 42, forward toward the box, carrying the paper with it until the face 75 of the presser bar presses one-half the paper at 77 against the side of the box. The further movement of the member 39 is stopped by the box, and the springs 52 are compressed. The member 42 still moves forward, sliding on the member 39, thus bringing the other half of the paper 78 between the cutting edge 79 of the inner face of the hook 74 and the upper edge of the cutter 42, thus cutting or shearing the strip half in two, as shown at 80 in Fig. 21. The member 42 slides forward sufficiently to force the cut half 78 of the strip against the side of the box, holding it tightly and smoothly against the side. The bars 43 are now brought inwardly, forcing the member 42 tightly against the side of the box, thus insuring the adhesion of the tape thereto. In the modification shown in Fig. 9, the position of the tools may be quickly and independently adjusted by means of a right and left screw 81 operated by a handle 82.

Referring now to sheets 6, 7 and 8. In this form the separator fingers are mounted separately from the cutter and presser bar, and these latter tools are set at an angle of forty-five degrees at the side of the box. In this modification, one pair of separator fingers is dispensed with, and the remaining pair 83 formed each of a pair of members 84, separated by a space, thus giving four points of contact and insuring a stable support for the box. The movement of the separator fingers is effected through power transmitted from the main shaft in any desired manner to a lever 85, on which is mounted a screw 86 working in a threaded lug 87 on a tool holder 88 sliding on the plate 89. This tool holder carries the separator guide 90, through which the upright member 91 of the separator works. The spring 92, attached to the lever 93 and the hanger 94, tends to hold the fingers in their uppermost position. The movements of the cutter and presser tools are also effected through the medium of power from the main shaft through any desired intermediary and transmitted to the lever 95, on which are mounted links 96, and on each side of the end of these links are secured bell crank levers 97 pivotally mounted on the frame at 98. On the outer end of these bell crank levers are pivotally mounted bearings 99, in which is journaled a screw bolt 100, serving as a pitman to operate the cutter and presser. The skeleton table 101 has four extending wings 102, each provided with a channel 103, at right angles to the length, and a movable plate 103ª having a rib or guide 104 sliding within the channel 103. This plate is slotted at 105, and a bolt and nut 106 regulate the movement of the two plates. A gib and guide 107 is mounted on this plate, carrying a sliding bar 108. The pitman 100 passes through a threaded socket 109 mounted on the slide bar 108, and to the extension 110 of this slide is secured the cutter and presser tools proper by means of a bolt and nut 111. In an ear 112, on the plate 103ª, is formed a threaded socket for the screw bolt 113 operated by a handle 114. By the manipulation of this screw, the lateral position of the plate and tools may be varied to adapt the machine to various sizes of boxes. In this form of my machine, the cutter and presser tools are practically the same and operated in practically the same manner as before described, except the pressing faces and cutting edges are disposed at an angle of 45 degrees to their line of travel, thus bringing them parallel to the sides of the box, as in the other form. The pin 49 is omitted, and stops 115 secured on the ends of the pin 53. The slotted guide 64 is mounted on top of the presser bar, parallel to the side 116 of the box, and at right angles to the side 117 of the box. The tape rolls 55 are journaled on a shaft 118, and their position may be shifted on this shaft so the tape may always be delivered to the guide at right angles to the side 116, thus preventing any chance of twisting the tape. The tape is cut and pressed in position on the corners of the box by the same operation as heretofore described. By the use of this form of my device, however, I secure a better adhesion of the tape to the box, for the reason that as the direction of the stroke of the tool is at an acute angle to the box, the presser bars exert a drawing or smoothing effect upon the tape, pulling the sides 77, 78, away from the center line, and drawing them tightly against the sides of the box, holding them in place until they have adhered thereto.

Heretofore the tape has been fed into the machine, and in the securing of it to the corners of the box it has been necessary to bend it into the shape of a right angle. The curving of an angularly formed strip being always attended by a bulging of the sides. This bending or forming of the tape is apt to extend upwardly or outwardly toward the roll, often seriously interfering with its feeding in proper position for operation. In my device, however, the tape is fed flat to the box, and all dangers of the above character eliminated. Furthermore, by partly severing the tape before its application, I secure a much better union between the box and tape, and a correspondingly neater and better box is the result.

I claim:

1. A box making machine comprising a blank feeding mechanism, forming mechanism, means for feeding the tape into operative position, means for partially severing said tape before it is secured in place upon the box, means for pressing said tape in place, and means for completely severing the tape.

2. A box making machine comprising a blank feeding mechanism, a forming mechanism, means for feeding the tape into operative position, adjustable means for partially severing said tape before it is secured in place upon the box, means for pressing said tape in place, and means for completely severing the tape.

3. A box making machine comprising a blank feeding mechanism, forming mechanism, means for feeding the tape into operative position, a series of adjustable cutters for partially severing said tape before it is secured in place upon the box, means for pressing said tape in place, and means for completely severing the tape.

4. A box making machine comprising a blank feeding mechanism, forming mechanism, means for feeding the tape into operative position, a series of adjustable cutters for partially severing said tape before it is secured in place upon the box, means for pressing said tape in place, acting in conjunction with said cutters, and means for completely severing the tape.

5. In a box making machine, means for bringing tape into position to be secured to the box and means for securing said tape to the box and folding only such tape as is secured to the box, said means including devices for a partial severing only of said tape.

6. In a box making machine, means for bringing tape into position to be secured to the box and means for securing said tape to the box and folding only such tape as is secured to the box, said means including devices for the partial severing only of said tape on a level with the top of the box.

7. In a box making machine, a presser bar, a cutter bar mounted thereon leaving a passage for the introduction of tape between opposite faces of said bars, and means including said cutter bar for severing said tape.

8. In a box making machine, an adjustable presser bar, a cutter bar mounted thereon leaving a passage for the introduction of tape between opposite faces of said bars, and means including said cutter bar for severing said tape.

9. In a box making machine, a presser bar, an adjustable cutter bar mounted thereon leaving a passage for the introduction of tape between opposite faces of said bars, and means including said cutter bar for severing said tape.

10. In a box making machine, a presser bar, a cutter bar mounted thereon leaving a passage for the introduction of tape between opposite faces of said bars, and adjustable means including said cutter bar for severing said tape.

11. In a box making machine, an adjustable presser bar, an adjustable cutter bar mounted thereon leaving a passage for the introduction of tape between opposite faces of said bars, and adjustable means including said cutter bar for severing said tape.

12. In a box making machine, an adjustable spring controlled presser bar, a cutter bar mounted thereon leaving a passage for the introduction of tape between opposite faces of said bars, and means including said cutter bar for severing said tape.

13. In a box making machine, an adjustable spring controlled presser bar, an adjustable cutter bar mounted thereon leaving a passage for the introduction of tape between opposite faces of said bars, and adjustable means including said cutter bar for severing said tape.

14. In a box making machine, an adjustable spring controlled presser bar, an adjustable presser and cutter bar mounted thereon leaving a passage for the introduction of tape between opposite faces of said bars, adjustable means including said cutter bar for severing said tape, said combined cutting and pressing member sliding along the side of said pressing member and adapted to partially sever said tape and fold said severed portion against the side of said box while the presser bar holds the balance of said tape against the other side of said box.

15. In a box making machine, cutting and pressing mechanism comprising a spring controlled presser bar and a recessed pressing and cutting bar mounted thereon so positioned that tape may be brought between the outer face of said presser bar and the inner face of said cutting bar, said combined cutting and pressing member mounted to slide on said presser and partially sever said tape and fold and press said severed portion against one side of the box while the presser bar presses the other portion against the adjacent side of the box, and means for imparting motion to said parts.

16. A box making machine comprising a blank feeding mechanism, forming mechanism, means for feeding the tape into operative position, means for partially severing said tape before it is secured in place upon the box, means for pressing said tape in place, said severing and pressing means operating in a line coincident with the diagonals of said box, and means for completely severing the tape.

17. A box making machine comprising a blank feeding mechanism, forming mechanism, means for feeding the tape into operative position, a series of adjustable cutters for partially severing said tape before it is secured in place upon the box, means for pressing said tape in place, said severing and pressing means operating in a line coincident with the diagonals of said box, and means for completely severing the tape.

18. A box making machine comprising a blank feeding member, forming mechanism, cutting and pressing mechanism adapted to operate in a line coincident with the diagonals of the side of a box, comprising a spring actuated presser bar, a cutter bar mounted thereon, a combined cutting and pressing member slidably mounted on said presser bar, and means for transmitting power thereto.

19. A box making machine comprising a blank feeding member, forming mechanism, cutting and pressing mechanism adapted to operate in a line coincident with the diagonals of the side of a box, comprising a spring actuated presser bar, a cutter bar mounted thereon, a combined cutting and pressing member slidably mounted on said presser bar, a series of plates and guides and pitman whereby the position of said mechanism may be adjusted, and means for transmitting power thereto.

20. A box making machine comprising a blank feeding mechanism, forming mechanism, cutting and pressing members adapted to operate in a line coincident with the diagonals of the sides of a box, the cutting and pressing faces of said members being parallel to adjacent sides of said box, comprising a spring actuated presser bar, a cutter bar mounted thereon, a combined cutting and pressing member slidably mounted on said presser bar, and means for transmitting power thereto.

21. In a box forming machine, tape feeding mechanism, means for securing said tape in position, and means for creasing and partially severing only such tape as is actually secured to the box.

Signed by me at Chicago, Illinois, this 17th day of July, 1908.

JOHN N. J. HILBERT.

Witnesses:
F. H. DRURY,
A. J. SAUSER.

Copies of this patent may be obtained for five cents each, by addressing the "Commissioner of Patents, Washington, D. C."